(12) United States Patent
Okada

(10) Patent No.: US 9,254,597 B2
(45) Date of Patent: Feb. 9, 2016

(54) ADJUSTMENT MECHANISM FOR MOVABLE PLATEN

(71) Applicant: FANUC Corporation, Yamanashi (JP)

(72) Inventor: Shingo Okada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/505,664

(22) Filed: Oct. 3, 2014

(65) Prior Publication Data

US 2015/0099031 A1   Apr. 9, 2015

(30) Foreign Application Priority Data

Oct. 4, 2013  (JP) .................................. 2013-209066

(51) Int. Cl.
*B29C 45/17* (2006.01)
*B29C 45/66* (2006.01)

(52) U.S. Cl.
CPC ......... *B29C 45/1761* (2013.01); *B29C 45/1744* (2013.01); *B29C 45/661* (2013.01); *B29C 2045/1784* (2013.01); *B29C 2045/662* (2013.01)

(58) Field of Classification Search
CPC ............ B29C 45/1744; B29C 45/1761; B29C 2045/1784
See application file for complete search history.

(56) References Cited

U.S. PATENT DOCUMENTS

| | | | | |
|---|---|---|---|---|
| 3,674,400 | A * | 7/1972 | Sauerbruch et al. | 425/225 |
| 5,297,952 | A * | 3/1994 | Leonhartsberger | 425/593 |
| 7,134,863 | B2 * | 11/2006 | Yamanaka et al. | 425/190 |
| 7,168,946 | B2 * | 1/2007 | Koike et al. | 425/595 |
| 7,217,116 | B2 * | 5/2007 | Nishimura et al. | 425/190 |
| 8,043,083 | B2 * | 10/2011 | Nishimura et al. | 425/190 |
| 2004/0043104 | A1 | 3/2004 | Nishimura et al. | |
| 2006/0228438 | A1 * | 10/2006 | Koike et al. | 425/472 |
| 2011/0052749 | A1 | 3/2011 | Nishimura et al. | |

FOREIGN PATENT DOCUMENTS

| | | |
|---|---|---|
| JP | 2004-90373 A | 3/2004 |
| JP | 2009-262514 A | 11/2009 |
| JP | 2011-51249 A | 3/2011 |

OTHER PUBLICATIONS

Decision to Grant a Patent mailed Aug. 4, 2015, corresponding to Japanese patent application No. 2013-209066.

* cited by examiner

*Primary Examiner* — James Mackey
(74) *Attorney, Agent, or Firm* — Hauptman Ham, LLP

(57) ABSTRACT

An adjustment mechanism for a movable platen of an injection molding machine is provided with a push bolt, configured to apply a force to push up the movable platen against a gravitational force, and a pull bolt, configured to apply a force to draw in the movable platen in the direction of gravity. The movable platen is adjusted by regulating its height above a base of the molding machine in a plurality of positions at different distances from a fixed platen.

4 Claims, 3 Drawing Sheets

ADJUSTMENT MECHANISM FOR MOVABLE PLATEN

RELATED APPLICATIONS

The present application claims priority to Japanese Application No. 2013-209066, filed Oct. 4, 2013, the disclosure of which is hereby incorporated by reference herein in its entirety.

BACKGROUND OF THE INVENTION

1. Field of the Invention

The present invention relates to an adjustment mechanism for a movable platen used in an injection molding machine.

2. Description of the Related Art

FIG. 1 is a view showing a mold clamping unit of an injection molding machine. The mold clamping unit comprises a movable platen 30, rear platen 31, toggles 32, fixed platen 33, crosshead 34, and ball screw shaft 38. The rear platen 31 and the fixed platen 33 are connected by a plurality of tie-bars 41, and the movable platen 30 can be advanced (to the right in FIG. 1) toward and retracted (to the left in FIG. 1) from the fixed platen 33 by the toggles 32.

A mold 40 is mounted on the movable platen 30. The position of the movable platen 30 can be changed by advancing or retracting the crosshead 34 on the ball screw shaft 38. If the crosshead 34 is advanced (to the right in FIG. 1), in this case, the movable platen 30 is advanced to close the mold.

In precision molding such as lens molding, the parallelism between the fixed and movable platens greatly affects the quality of molded products. The parallelism in the vertical direction is conventionally adjusted by changing the slant or inclination of the movable platen. In general, the inclination of the movable platen is changed by changing the respective heights of the fixed-platen-side end portion of a support portion between the movable platen and the base frame and the opposite end portion. The heights of the two opposite end portions of the support portion are typically changed by a method using wedges, shims, or bolts.

Japanese Patent Application Laid-Open No. 2009-262514 discloses a technique related to an inclination adjustment method for a movable platen using a bolt-and-wedge assembly. Bolts are used as adjustment elements for adjusting the height of the movable platen above a base of a molding machine. The distal ends of the respective threaded portions of the bolts contact the fixed-platen-side end portion of a support block, which is inserted below the movable platen, and the end portion opposite thereto. Thus, the level of the movable platen in the vertical direction above the base of the molding machine in a position corresponding to each of the bolts can be adjusted by means of a wedge-shaped portion of the support block by rotating the bolts.

In the technique disclosed in Japanese Patent Application Laid-Open No. 2009-262514 described above, a front or rear inclination of the movable platen toward a fixed platen can be adjusted by regulating the vertical positions of the movable platen on the fixed-platen side and the opposite side by means of the wedge-shaped portion of the support block by rotating the bolts. Normally, in this case, the movable platen is designed so that its center of gravity is located at an intermediate point between the positions of contact of the bolts, and the degrees to which the positions are raised are adjusted by the weight of the movable platen. If a mold is mounted on the movable platen, however, the position of the center of gravity may be sometimes changed and shifted from between the positions of contact of the bolts. If the bolts are adjusted in this case, the entire movable platen only moves up and down and its inclination cannot be adjusted, in some cases.

SUMMARY OF THE INVENTION

Accordingly, the object of the present invention is to provide an adjustment mechanism for a movable platen, capable of adjusting the inclination of a movable platen used in an injection molding machine without regard to the position of the center of gravity of the movable platen.

The present invention relates to an adjustment mechanism for a movable platen used in a mold clamping unit of an injection molding machine. The mold clamping unit comprises a fixed platen fixed on a base and a movable platen placed substantially parallel to the fixed platen on the base. The adjustment mechanism for the movable platen includes: a push bolt configured to apply a force to push up the movable platen against a gravitational force; and a pull bolt configured to apply a force to draw in the movable platen in the direction of gravity. The height of the movable platen above the base of the injection molding machine in a plurality of positions at different distances from the fixed platen is adjusted using the push bolt and the pull bolt so that the height and inclination of the movable platen with respect to the fixed platen are adjusted.

The push bolt and the pull bolt may be arranged so that the head portion of the push bolt and the head portion of the pull bolt extend in one direction.

The adjustment mechanism may further include a fixing bolt configured to secure the base and the movable platen to each other, wherein the fixing bolt extends perpendicular to the push bolt and the pull bolt.

The base may include a support portion for the movable platen, the fixing bolt may penetrate the support portion and is secured to the movable platen, and an interval between the support portion and the fixing bolt secured to the movable platen may be set as an adjustable range of the height of the movable platen above the base of the injection molding machine and the inclination of the movable platen with respect to the fixed platen.

According to the present invention, the inclination of a movable platen used in an injection molding machine can be adjusted without regard to the position of the center of gravity of the movable platen.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

A mold clamping unit of an injection molding machine incorporating a first embodiment of an adjustment mechanism for a movable platen according to the present invention will first be described with reference to FIG. 1.

Figure 1:
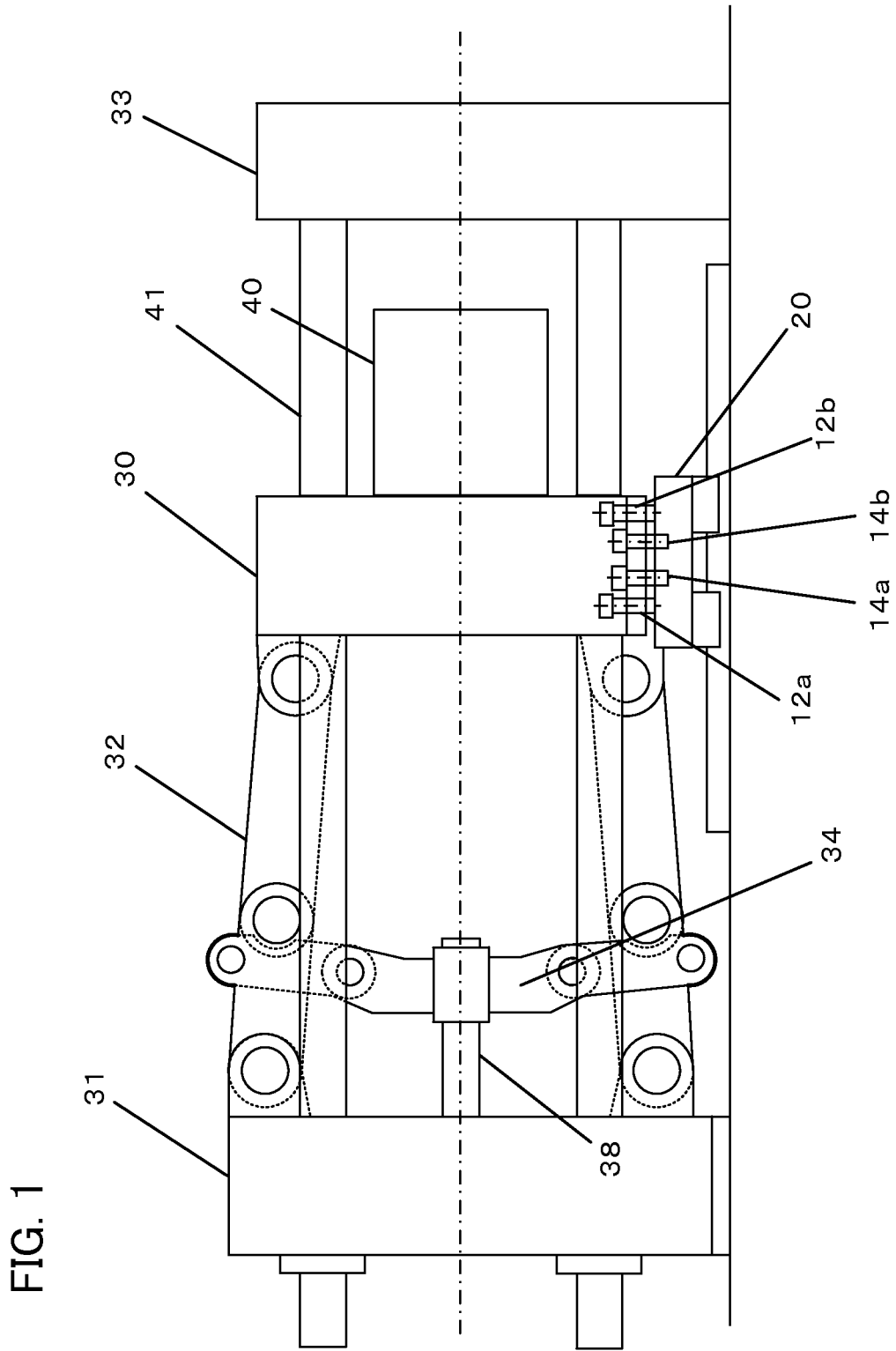
FIG. 1 is a schematic view of a mold clamping unit of an injection molding machine incorporating a first embodiment of an adjustment mechanism for a movable platen according to the present invention.

The mold clamping unit of the injection molding machine shown in FIG. 1 operates in the same manner as in the prior art.

In the present embodiment, a support portion 20 is provided on a base frame to which a fixed platen 33 is secured, and one or more push bolts 12 (12a and 12b) and one or more pull bolts 14 (14a and 14b) are arranged between the base 20 and the movable platen 30.

The push bolts 12 are screwed into the movable platen 30 and are configured so that their distal end portions contact the upper surface of the support portion 20. If the push bolts 12 are screwed in, their distal end portions press the upper surface part of the support portion 20, thereby pushing up the movable platen 30. Thus, that part of the movable platen 30 corresponding to the push bolts 12 is raised by a distance equal to the lift.

On the other hand, the pull bolts 14 are screwed into both the movable platen 30 and the support portion 20. If the pull bolts 14 are screwed in, their head portions push down the movable platen 30, thereby drawing in the movable platen 30 in the direction of gravity. Thus, that part of the movable platen 30 corresponding to the pull bolts 14 is lowered by a distance equal to the depression.

According to the example of FIG. 1, one (12b) of the two push bolts 12 is located closest to the fixed platen 33, while the other (12a) is located farthest from the fixed platen 33. The two pull bolts 14a and 14b are arranged between the two push bolts 12a and 12b.

Conventionally, only the push bolts 12 are used to push up the movable platen 30. If a mold is mounted on the movable platen 30 so that the center of gravity of the movable platen 30 is shifted from between the push bolts 12, for example, the entire movable platen 30 only moves up and down and its inclination cannot be adjusted even though the push bolts 12 are adjusted. If the pull bolts 14 are also provided, as in the present embodiment, however, the inclination of the movable platen 30 can be adjusted without regard to the position of the center of gravity of the movable platen 30.

In the present embodiment, the push bolts 12 and the pull bolts 14 are respectively provided in pairs. However, the number of these bolts can be suitably set as far as at least on push bolt 12 and at least one pull bolt 14 are provided. Therefore, the positions where the push bolts 12 are to be screwed into the movable platen 30 need not always be the two positions closest to and farthest from the fixed platen 33. Further, the positions where the pull bolts 14 are to be screwed into both the movable platen 30 and the support portion 20 need not always be intermediate between the two push bolts 12a and 12b, either.

In the present embodiment, furthermore, the support portion 20 is provided on a guide between the movable platen 30 and the base frame, and the movable platen 30 is disposed on the support portion 20. Alternatively, however, the movable platen 30 may be disposed directly on the guide without the use of the support portion 20.

Figure 2:
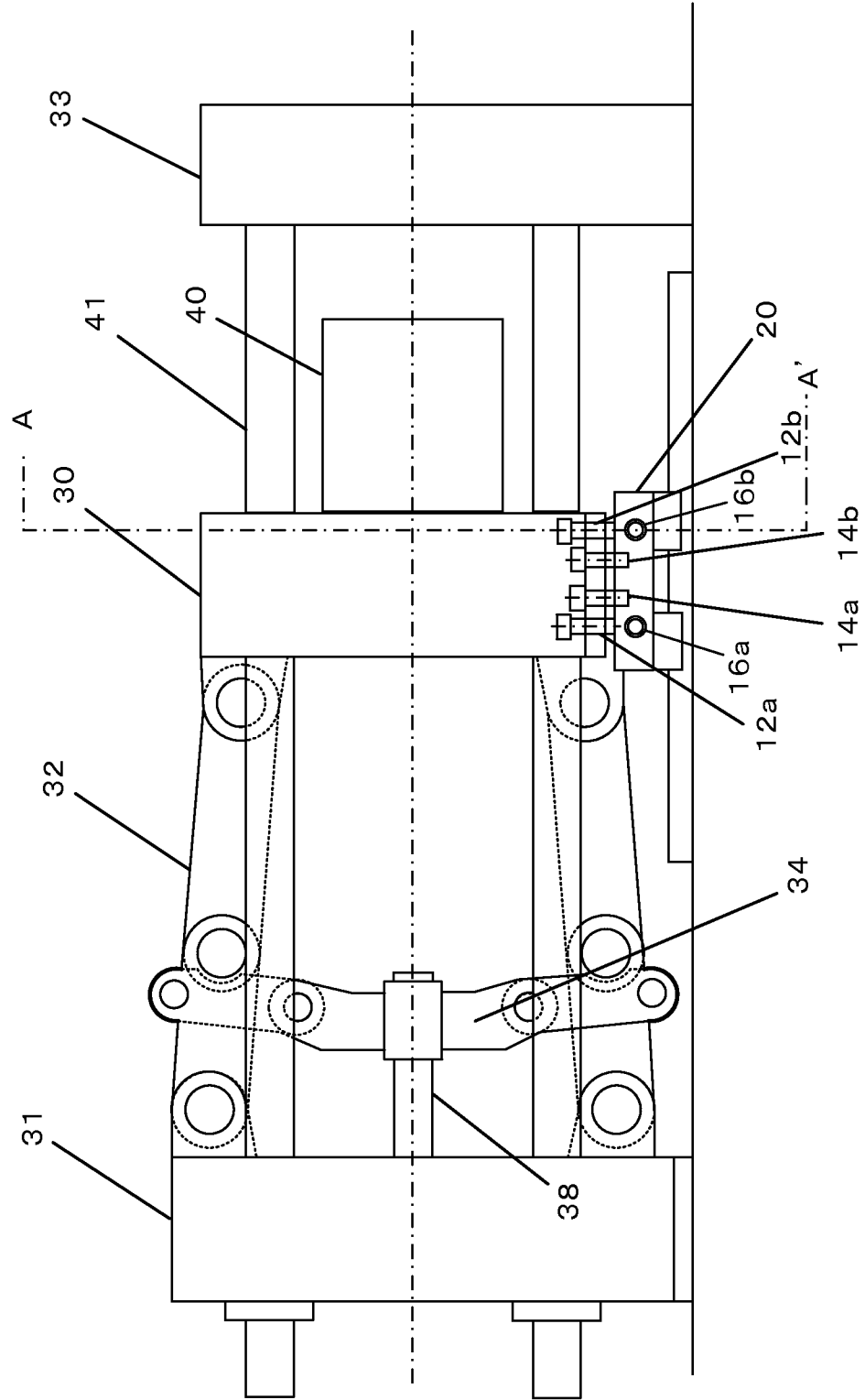
FIG. 2 is a schematic view of a mold clamping unit of an injection molding machine incorporating a second embodiment of the adjustment mechanism for a movable platen according to the present invention.

A mold clamping unit of an injection molding machine incorporating a second embodiment of the adjustment mechanism for a movable platen according to the present invention will now be described with reference to FIG. 2.

Figure 3:
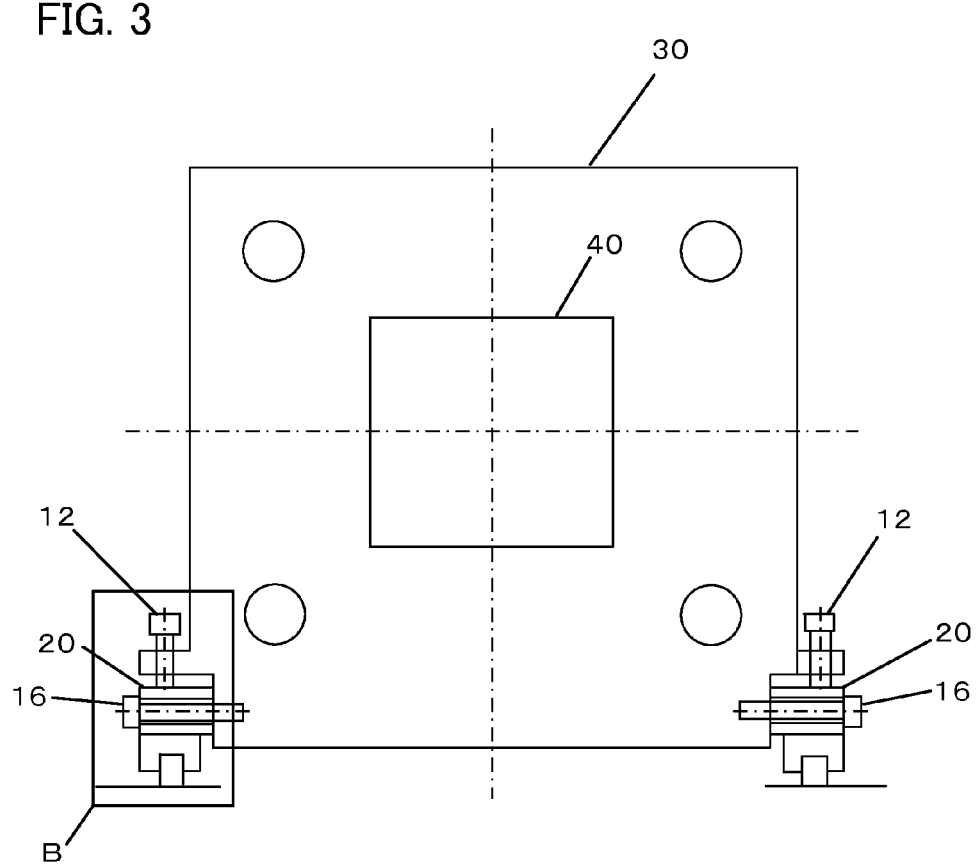
FIG. 3 is a sectional view taken along line A-A' of FIG. 2.

The present embodiment differs from the first embodiment in that two fixing bolts 16 (16a and 16b) are arranged horizontally (at right angles to the axes of tie-bars 41) on a support portion 20 on a base frame. As shown in FIG. 3, the fixing bolts 16 are passed individually through through-holes in each support portion 20 and their distal ends are threadedly engaged with a movable platen 30. The support portion 20 is firmly secured to the movable platen 30 by the fixing bolts 16.

Further, the fixing bolts 16 extend perpendicular to push bolts 12 and pull bolts 14 and horizontally connect each support portion 20 to the movable platen 30. Thus, the inclination of the movable platen 30 can be adjusted by the push and pull bolts 12 and 14 with the fixing bolts 16 loosened. Even if the fixing bolts 16 are tightened after the inclination of the movable platen is adjusted, the tightening does not affect the result of the adjustment by the bolts 12 and 14, since the tightening direction of the fixing bolts 16 is perpendicular to the extending direction of the bolts 12 and 14.

Figure 4:
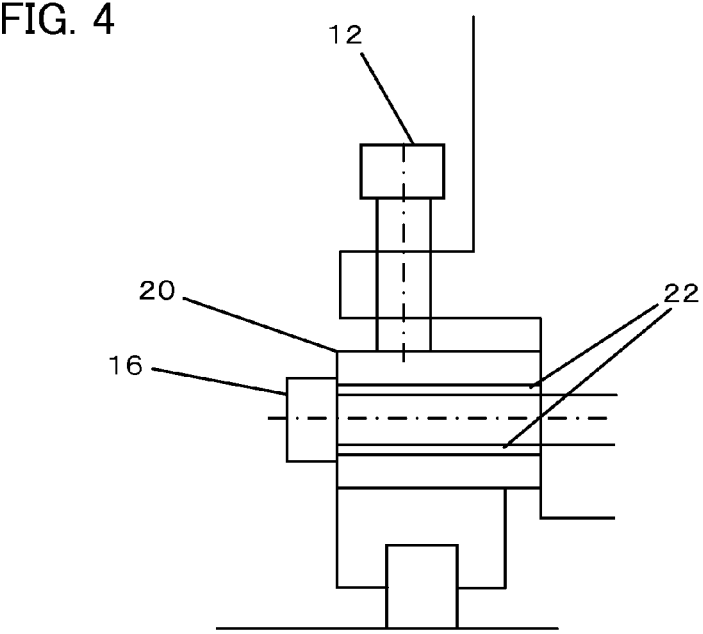
FIG. 4 is an enlarged view of a portion B in FIG. 3.

The fixing bolts 16 are passed individually through the through-holes (FIG. 3) in each support portion 20 and their distal ends are threadedly engaged with the movable platen 30. Since the inner diameter of each through-hole in the support portion 20 is larger than the outer diameter of each fixing bolt 16, as shown in the enlarged view of FIG. 4, a gap 22 is formed between each through-hole of the support portion 20 and the fixing bolt 16 that penetrates the through-hole. In the present embodiment, the size of the gap 22 determines a range in which the inclination of the movable platen 30 is adjustable. It is unnecessary, therefore, to separately provide a mechanism for restricting the adjustable range for the inclination of the movable platen 30, so that the number of parts used can be reduced.

In the present embodiment, the push bolts 12 and the pull bolts 14 are respectively provided in pairs, as in the first embodiment shown in FIG. 1, and the fixing bolts 16 are provided in a pair. However, the number of these bolts 12, 14 and 16 can also be suitably set. Further, the movable platen 30 and the tie-bars 41 may or may not be provided with a sliding portion each. Furthermore, a linear guide or slide guide can be used as the guide between the movable platen 30 and the base frame. In the case where the linear guide is used, it is bound in all other directions than the direction in which it normally moves back and forth. Thus, even if a pulling-up force is generated by the pull bolts 14, it does not affect the guide function. Also in the case where the slide guide is used, it is only necessary to provide a lift prevention mechanism for preventing the pull bolts 14 from causing a lift.

The invention claimed is:

1. An adjustment mechanism for a movable platen used in a mold clamping unit of an injection molding machine, wherein the mold clamping unit comprises a fixed platen fixed on a base and a movable platen placed substantially parallel to the fixed platen on the base; the adjustment mechanism for the movable platen comprising:

a push bolt configured to apply a force to push up the movable platen against a gravitational force; and a pull bolt configured to apply a force to draw in the movable platen in the direction of gravity, wherein the height of the movable platen above the base of the injection molding machine in a plurality of positions at different distances from the fixed platen is adjusted using the push bolt and the pull bolt so that the height and inclination of the movable platen with respect to the fixed platen are adjusted.

2. The adjustment mechanism according to claim 1, wherein the push bolt and the pull bolt are arranged so that a head portion of the push bolt and a head portion of the pull bolt extend in one direction.

3. The adjustment mechanism for a movable platen according to claim 1, further comprising:

a support portion moveable on the base, and a fixing bolt configured to secure the support portion and the movable platen to each other, wherein the fixing bolt extends perpendicular to the push bolt and the pull bolt.

4. The adjustment mechanism for a movable platen according to claim 3, wherein the fixing bolt penetrates the support portion and is secured to the movable platen, and an interval between the support portion and the fixing bolt secured to the movable platen is set as an adjustable range of the height of the movable platen above the base of the injection molding machine and the inclination of the movable platen with respect to the fixed platen.

\* \* \* \* \*